Jan. 12, 1960     J. P. O'NEILL ET AL     2,921,288
UNDERWATER SIGNALLING

Filed March 20, 1946     2 Sheets-Sheet 1

Fig. 2-A.

INVENTORS
John P. O'Neill
& John S. Leigh
BY
C. D. Tuska
ATTORNEY

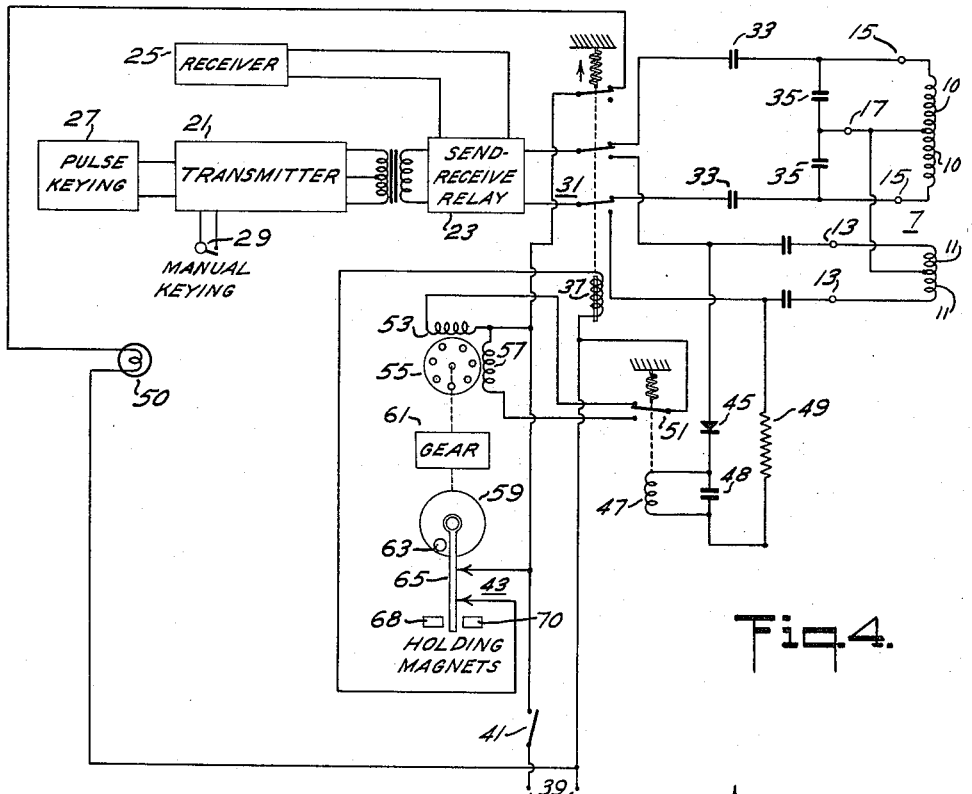

United States Patent Office 2,921,288
Patented Jan. 12, 1960

2,921,288

UNDERWATER SIGNALLING

John P. O'Neill, Philadelphia, Pa., and John S. Leigh, Haddonfield, N.J., assignors, by mesne assignments, to the United States of America as represented by the Secretary of the Navy Application March 20, 1946, Serial No. 655,696

9 Claims. (Cl. 340—5)

This invention relates to underwater signalling and in particular to an improved method of and apparatus for modifying the directional radiation characteristics of an electromechanical transducer and for preventing overheating due to the excessive application of electrical energy to such a transducer.

Systems are known in which an electromechanical transducer, such as a magnetostrictive or piezo-electric device, is used to transmit sound waves through water, and the energy reflected from an object is received and used to determine the direction and distance of the object. It has been customary to design the transducer so as to produce a narrow radiation beam in both a horizontal and vertical plane, assuming the radiation diaphragm to be in a vertical plane, which is comparable to the beam of a searchlight. Suitable apparatus is employed to measure the time required for a pulse to travel from a ship on which the apparatus is located to a submarine, and for the echo to return to the ship. The elapsed time is a measure of the distance. The transducer is arranged for mechanical rotation about a vertical axis. The direction of the submarine is indicated by the position of the transducer when maximum signal response is obtained.

In systems of this type is has been noted that in closing with a submarine for the purpose of dropping depth charges, contact is frequently lost due to the fact that the submarine goes to considerable depth and thus gets out of the field of the energy beam, particularly when the ship is about to pass over the submarine. While systems could be devised for tilting the projector downward so as to follow the submarine, such systems would be cumbersome and bulky and it is preferable to shift the direction of maximum radiation of the beam in a downward direction by electrical means, so as to maintain contact with the submarine under these conditions. It is therefore the primary object of this invention to provide an improved method of and means for varying the directional radiation pattern of a magnetostrictive transducer so as to be able to direct its radiation downwards when desired and thus maintain contact with the submarine at all times.

Underwater signalling systems also conventionally employ a pulse type of transmission in which a large amount of power is applied to the transducer for short periods of time, at relatively long intervals. Under these conditions, no appreciable overheating effect is noticed. However, it is frequently desirable to substitute manual keying for the automatic pulse type keying and to listen to the received impulses for purposes of identification, to maintain contact, or even for intership communication. In such case it has been found that if the operator applies maximum power to the transducer for too long a period of time, serious overheating may result which will cause the resonant magnetostrictive elements to expand and become detuned, and which may even result in permanent injury to the mechanism. It is therefore a further object of this invention to provide automatic means for limiting the application of power to a transducer when operated manually.

A further object of this invention is to provide an improved magnetostrictive transducer. A still further object of this invention is to provide an improved underwater signalling system employing a novel means for electrically varying the directional characteristics of the magnetostrictive transducer. A still further object of this invention is to provide a novel control means for automatically limiting the application of power to a magnetostrictive transducer to prevent damaging the elements thereof.

The above objects, as well as additional objects which will appear from a further consideration of this invention, are accomplished by providing in the piezo-electric or magnetostrictive transducer a single horizontal row of magnetostrictive elements which may be connected selectively to the transmitter, or receiver, and which provide a directive pattern broad in a vertical plane, but narrow in a horizontal plane. In order to limit the power applied to the horizontal row of elements, a relay responsive to the applied currents is utilized to control the operation of a reversible motor which drives a cam at such a speed that the power is removed from the transducer at the end of a preselected period of time, and which thereafter automatically resets itself after a predetermined time interval, at the end of which power may be reapplied to the transducer.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a diagram illustrating the change in directional characteristics required to maintain close contact;

Figures 2 and 2–A are a plan and elevation, respectively, of a magnetostrictive transducer, in section;

Figure 4 is a schematic diagram of an automatic relay system for controlling the application of power to the transducer, Figure 5 is a schematic diagram of a modification of the arrangement of Fig. 4, and Figure 6 is a schematic diagram of an alternate modification of the arrangement of Fig. 4.

Figure 1:
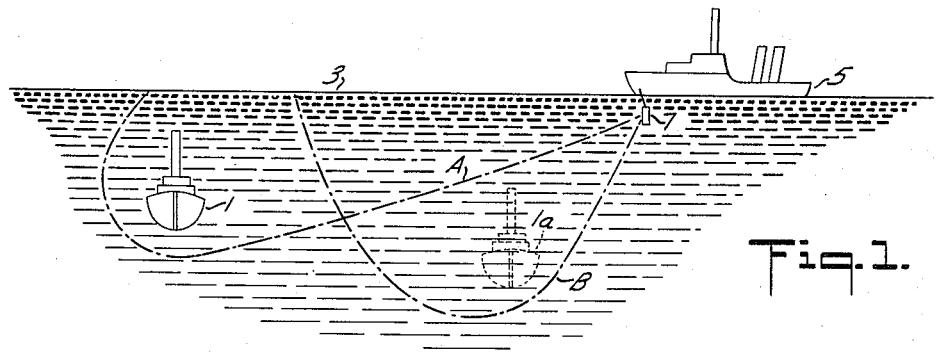

Referring first to Fig. 1, submarine 1 is to be located beneath the surface of the ocean 3 by an echo type intercepting system carried by a ship 5 and including a magnetostrictive transducer 7. In order to obtain the maximum range possible, the transducer is designed to have a directional radiation characteristic in a vertical plane similar to that indicated by the dotted line A. The directional characteristic measured in a horizontal plane, not shown, is similar to the vertical characteristic in order to provide the greatest possible concentration of power and thus the greatest range for a given intensity of the received echo. During the operational run the ship 5 approaches a position over the submarine, which frequently seeks safety by diving to a great depth. When the ship closes with the submarine their relative positions are then indicated in Fig. 1 by the ship 5 and the submarine at 1a. It will be seen that the submarine has now passed below the region of maximum radiation since it no longer lies within the field of energy distribution A. In order not to lose contact with the submarine, the operator on the ship then manipulates a "maintain close contact" (M.C.C.) switch which changes the directional radiation characteristic to that shown by dotted line B. While the energy is not concentrated to such a high degree, this fact is now unimportant because the decreased distance between the ship and the submarine causes an increased echo signal to be received and no loss of operational efficiency results. However, in order to continue to obtain an accurate bearing of the angular position of the submarine with respect to the ship, the directional radiation characteristic of the transducer in a horizontal plane should still have the general shape of curve A.

Figure 2:
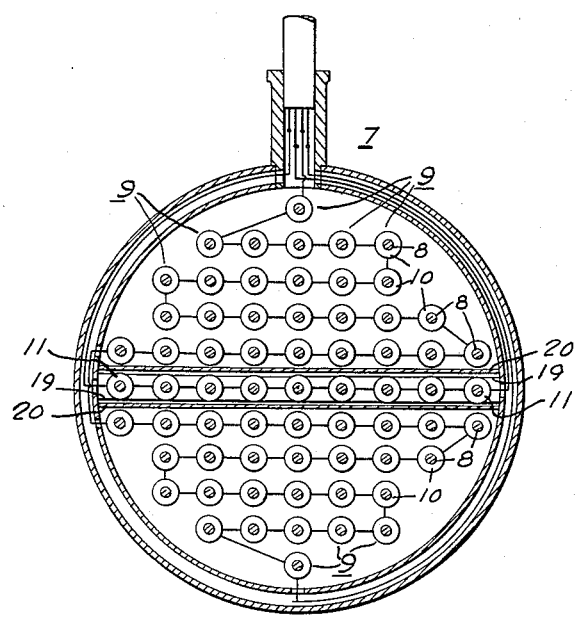
Figure 3:
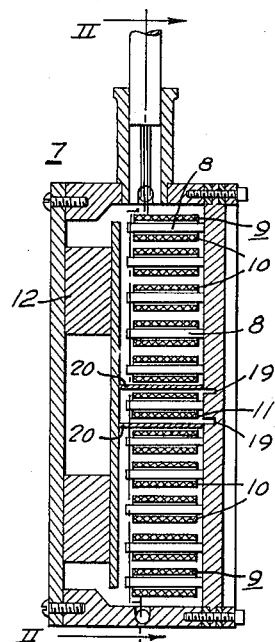
Figure 3 is a schematic diagram illustrating the connection of the driving elements of the transducer.
Figure 3:
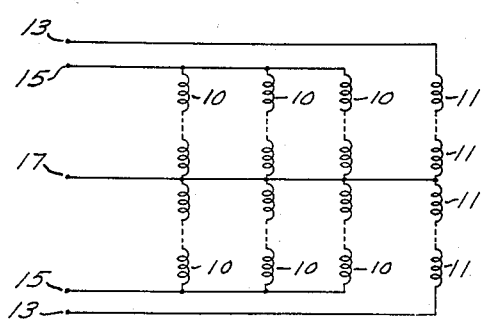

The above result is accomplished in a manner illustrated in Figs. 2 and 2-A, which represent a plan and section of the magnetostrictive transducer 7. The transducer 7 includes a large number of individual vibratory magnetostrictive transducer elements 9 spaced over the area of a diaphragm. Each element comprises a magnetostrictive rod 8 and a driving coil 10. Magnetic polarization means 12 is also provided in the conventional manner. A single row of elements including coils 11, however, is selected from those lying substantially along the diameter of the transducer, although they may be located above or below the center as desired. The individual coils 11 are connected in series and separate terminals are brought out of the transducer, through a suitable slip ring arrangement, for use in the Maintain Close Contact position. The connections of the various coils are illustrated in Fig. 3 in which, however, only a few of the individual coils have been shown due to the large number involved. The horizontally connected row comprising the series of coils 11 is terminated at terminals 13 while the remaining coils 10, connected in series-parallel groups, are terminated at terminals 15. A common center tap connection to all coils may be provided by a connection to terminal 17. In order to reduce the mechanical coupling between the single row of elements and the other elements of the transducer, two narrow slits 19 are provided on either side of the horizontal row. In addition, electrical coupling may be reduced by providing a shield 20 of suitable material, such as copper, on either side of the horizontal row, or located as necessary to electrically shield the two groups of elements.

If the full power which has been applied to the coils 10 is suddenly switched to the relatively few coils 11 of the horizontal row for broad band operation, it will be appreciated that the power dissipation in each element will be tremendously increased. For the reasons pointed out above, it is desirable to control the application of power to these elements to prevent their being damaged and to prevent excessive heating which would detune the magnetostrictive elements by reason of the increased length of the magnetostrictive tubes. This is accomplished as shown in Fig. 4, to which reference is now made.

A transmitter 21 has its output coupled to a "send-receive" relay 23 which is employed to connect the magnetostrictive transducer 7 either to the transmitter 21 or to a receiver 25 which includes any desired indicating devices. The relay is operated by the keying currents in the conventional manner. The transmitter 21 is provided with an automatic pulse keying device 27, or alternatively, a manually operated key 29. The output of the send-receive relay is connected to the movable contacts of a triple pole-double throw switch 31 which is normally biased by conventional means to the position indicated in the drawings. That is, in the normal position the contact arms connect the "send-receive" relay to the magnetostrictive transducer coils 10. Series and parallel capacitors 33, 35 are employed to tune the coils to resonance at the operating frequency, and to transform the resistive component of the transducer impedance at resonance to the value of pure resistance into which the driver is designed to work. The components described thus far constitute the equivalent of a conventional pulse type underwater signalling device and need not be described in greater detail.

Switch 31 is operated by the solenoid 37, which is connected to a source of 60 cycle alternating current, applied to terminals 39 through a normally open maintain close contact switch 41 and a normally closed cam operated switch 43.

A detector 45, a relay solenoid 47 bypassed by capacitor 48, and a resistor 49 are serially connected across the input terminals to the horizontal row of coils 11. The solenoid operates a single pole double throw switch 51 which in its normal or deenergized position, as illustrated, connects the alternating current source to one winding 53 of a reversible induction motor 55 through switch 41. In response to currents in solenoid 47, however, the switch disconnects winding 53 and connects the other winding 57 of the motor to the alternating current. During Maintain Close Contact operation, switch 51, therefore, causes the rotation of the motor in one direction when the horizontal row of elements is energized and in the other direction when this group of elements is not energized.

Motor 55 is coupled to a cam 59 through a suitable reduction gear 61 which is so constituted that the cam is caused to rotate at a speed of approximately two revolutions per minute. Cam 59 is provided with a switch actuating member 63 which engages a switch arm 65 to cause it to open switch 43 at the limit of its rotation in a clockwise direction, and to close the switch at the limit of its rotation in a counterclockwise direction. Switch arm 65 is held in an open or closed position by small permanent magnets 68, 70, which also act as stops to prevent continuous rotation of the motor. Assuming that the maintain close contact switch 41 has been closed but that power has not yet been applied by either keying device to the coils 11, the motor will cause the cam to rotate in a counterclockwise direction until the switch actuating member 63 contacts the switch arm 65 and closes switch 43, which actuates switch 31, connecting to the transmitter the proper coils for M.C.C. operation. The motor will then stall and no further rotation will occur. When key 29 is held down, power is applied to coils 11, relay 51 reverses the rotation of the motor and the cam rotates slowly in a clockwise direction until the switch actuating member 63 contacts the switch arm 65, breaking the contact and opening the circuit which previously energized coil 37. Switch 31 thereupon returns to its normal position and the power is removed from the coils 11. This in turn deenergizes solenoid 47 and switch 51 returns to its normal position and the rotation of motor 55 is again reversed. A time of approximately 30 seconds must then elapse before the cycle can be repeated. It is thus impossible for the operator to apply energizing current continuously to the coils 11 for a period in excess of 30 seconds, and after power has been applied for this period, a waiting period of at least 30 seconds is required before power can be reapplied.

A light indicator 50 is provided at the operator's position to advise him that the safety device has operated. The indicator is operated by the third section of switch 31, which connects it to the line, through the M.C.C. switch 41, when the switch is in its normal position. The indicator will not operate during normal ranging, however, because the M.C.C. switch is then open. If the operator keys the transmitter off and on during M.C.C. operation, the cam 63 will advance during "on" periods and return during "off" periods, as controlled by the operation of relay switch 51. If the "off" and "on" periods are of equal duration when averaged throughout the period of M.C.C. operation, the system will not shut off. It will only do so when the sum of the "on" periods exceeds the sum of the "off" periods by 30 seconds, at which point an enforced "off" period is automatically established to allow the transducer to cool. Consequently, motor 55 and associated apparatus constitute timing means operative to prevent temporarily the further application of power to the vibratory elements responsive to an excess of pulse duration, with respect to the spacing between pulses, of a predetermined amount.

An alternative system which operates to shut off the power to the horizontal group of M.C.C. coils when the "on" periods exceed the "off" periods by 30 seconds, but which does not require a 30 second waiting period, is illustrated in Fig. 5. Only that portion of Fig. 4 which is changed is shown, it being understood that the other portions of the system are as shown in Fig. 4. Motor 55 drives a cam 71 at a rate of ⅔ R.P.M. through a suitable reduction gear 61. The cam includes a switch operating portion 71a which extends 125° around the circumference of the circular cam body and which operates switch arm 73 to open the contact of switch 43 which controls the current in solenoid 37. A stop 75 is provided to limit counterclockwise rotation of the cam a few degrees beyond the position necessary to open the switch. A second stop 75 is provided which limits rotation in a clockwise direction to approximately 120° beyond the point at which the switch closes. This provides approximately 30 seconds delay before the switch is opened.

Switch 51 controls the direction of rotation of motor 55 as before, during M.C.C. operation. Solenoid 47, however, is energized through rectifier 45 and resistor 49 directly from the output of the send-receive relay.

The operation of this embodiment is as follows: When the M.C.C. switch 41 is open, the motor 55 is inoperative and the indicator light 50 is out. Switch 43 will normally be closed. To obtain M.C.C. operation, switch 41 is closed. This operates switch 37 and shifts the output connections to the M.C.C. coils 11. If not already at the limit of its clockwise rotation, cam 71 rotates in that direction toward stop 75. Pressing key 29 applies power to the transducer and also actuates relay switch 51, reversing the rotation of cam 71. The transducer may then be keyed. As before, an accumulated 30 seconds "on" time in excess of the "off" time is required to advance the cam to the point at which it opens switch 73 to switch the output from the M.C.C. coils. When this happens the indicator light flashes a warning to the operator, telling him that he is no longer in M.C.C. operation. If he persists in holding down the key, M.C.C. operation will be blocked. He will, however, immediately release the key. Within a few seconds, cam 71 will have rotated the few degrees necessary to close switch 73 again, re-establishing M.C.C. operation. At this time the indicator lamp will go out, advising the operator that he can continue.

A combination of the two systems may be employed as shown in Fig. 6, which is identical with the modification shown in Fig. 5 except that the relay 47 is energized only when currents are applied to the M.C.C. coils, as in the case illustrated in Fig. 4. The operation of this case differs only in that when "on" periods have exceeded "off" periods by 30 seconds, the power will be shifted from the M.C.C. coils and from relay 47 as well. Cam 71 will therefore immediately reverse its direction, closing switch 73 and reapplying the power to the M.C.C. coils. The subsequent reversal of the cam will reverse the process again. Thus the control will oscillate on and off, and the indicator lamp 50 will flash on and off until the operator opens the key. As before, operation thereafter can be carried on provided sufficient intervals are left between transmissions.

What we claim is:

1. An electromechanical transducer having a first radiation or reception pattern which is directional in perpendicular planes normal to the radiating surface thereof and a second radiation or reception pattern which is directional in one of said planes and substantially non-directional in the other, comprising a diaphragm having a wave-radiating and wave-responsive surface of dimensions greater than a wavelength of compressional waves in the signalling medium at the signalling frequency; two groups of vibratory elements mounted on said diaphragm, one of said groups comprising a single line of elements operatively associated with a first portion of the radiating surface of said diaphragm which in one dimension is greater than a wavelength and in the other dimension is less than a wavelength, the other group of elements comprising the remaining elements operatively associated with the remaining portion of the radiating surface of said diaphragm, which is greater than a wavelength in both dimensions; and means for selectively making connection to one or the other of said groups of elements.

2. A device of the character described in claim 1 in which said diaphragm is grooved on either side of said line of elements to reduce the transfer of vibratory energy between said first and remaining portions of said diaphragm.

3. An underwater signalling system which includes an electromechanical transducer having a diaphragm and a plurality of driving elements mounted thereon and connected in two groups, the first of said groups including driving elements positioned in a single line which, when energized, produce a broad directional radiation characteristic in a plane normal to said diaphragm and perpendicular to said line and a narrow directional radiation characteristic in a plane normal to said diaphragm and including said line, the second of said groups including the remaining elements, said elements being positioned to provide a narrow directional radiation characteristic in both of said planes, means for selectively applying energizing currents to said groups of elements, said first group of elements tending to become overheated by the continuous application of energizing currents thereto, and timing means operative to discontinue temporarily the further application of energizing currents to said first group in response to an energizing current which continues beyond a predetermined period.

4. A device of the character described in claim 3 in which said timing means operates to prevent the application of further energizing currents until the completion of a predetermined waiting period.

5. A device of the character described in claim 3 in which said timing means includes relay means responsive to currents in said first group of elements, a reversible motor whose direction of rotation is controlled by said relay means, a cam rotated by said motor and having a pinion movable between angularly spaced limits, and a switch actuated to a first position by said pinion when it reaches one of said limits and to a second position when it reaches the other of said limits, said switch controlling the operation of said means for selectively applying energizing currents to said groups of elements.

6. In an underwater signalling system, an electromechanical transducer having a plurality of driving elements mounted therein and electrically connected in two groups, the first of said groups comprising relatively a few of said elements located so as to produce a first directional radiation pattern, the second of said groups comprising the remainder of said elements located so as to produce a second directional radiation pattern, a source of signalling current, switching means for selectively connecting said source to one or the other of said groups, a reversible motor, relay means responsive to currents in said first group of elements after a predetermined maximum interval of time for effecting a predetermined direction of rotation of said motor, and means under the control of said motor when operating in said direction for actuating said switching means to disconnect the signal source from said first group of elements.

7. In an underwater signalling system, an electromechanical transducer having a plurality of driving elements mounted therein and electrically connected in two groups, the first of said groups comprising relatively a few of said elements located so as to produce a first directional radiation pattern, the second of said groups comprising the remainder of said elements located so as to produce a second directional radiation pattern, a source of signalling current, switching means for selectively connecting said source to one or the other of said groups of elements, keying means associated with said source for manually controlling off and on periods of said signalling current, the first of said groups tending to become overheated by the continuous application of signalling current, and control means, operable in response to the application of signalling current to said first group of elements, for discontinuing the application of said signalling current to said first group of elements after accumulated "on" periods exceed the "off" periods by a predetermined maximum interval of time and thereafter preventing the further application of signalling currents to said first group of elements until the completion of a predetermined waiting period.

8. A device of the character described in claim 7 in which said control means includes a reversible motor, means for causing said motor to rotate in one direction during said "on" periods and in the other direction during said "off" periods, movable means driven by said motor in one direction or the other between spaced points, and means for causing said movable means to operate said switching means to one position upon reaching one of said spaced points and to the other position upon reaching the other of said spaced points.

9. A device of the character described in claim 7 in which said control means includes a reversible motor, means for causing said motor to rotate in one direction during said "on" periods and in the other direction during said "off" periods, a second switch for controlling the operation of said switching means, and means associated with said motor and operable in either one of two directions in response to said motor for actuating said second switch.

References Cited in the file of this patent

UNITED STATES PATENTS

| | | |
|---|---|---|
| 1,893,741 | Hecht et al. | Jan. 10, 1933 |
| 1,969,005 | Hecht | Aug. 7, 1934 |
| 2,009,451 | Kunze | July 30, 1935 |
| 2,063,950 | Steinberger | Dec. 15, 1936 |
| 2,070,570 | Batchelder | Feb. 16, 1937 |
| 2,405,225 | Mason | Aug. 6, 1946 |
| 2,407,662 | Hart | Sept. 17, 1946 |
| 2,426,589 | Bollman | Sept. 2, 1947 |
| 2,427,180 | Ballard | Sept. 9, 1947 |